United States Patent [19]

Gillis

[11] Patent Number: 5,655,743

[45] Date of Patent: Aug. 12, 1997

[54] KEYBOARD TRAY

[76] Inventor: Charles A. Gillis, 5048 Netherstone Ct., Columbia, Md. 21045

[21] Appl. No.: 621,876

[22] Filed: Mar. 26, 1996

[51] Int. Cl.⁶ .......................... A47B 91/00; A47G 29/00
[52] U.S. Cl. .......................... 248/346.01; 248/918
[58] Field of Search .......................... 248/346.01, 346.07, 248/448, 678, 917, 918, 924, 118, 147, 149; 108/137, 143

[56] References Cited

U.S. PATENT DOCUMENTS

| | | | |
|---|---|---|---|
| 3,123,935 | 3/1964 | Williams | 248/346.01 |
| 4,305,563 | 12/1981 | Presson | 248/918 X |
| 4,564,091 | 1/1986 | Coneglio | 108/143 X |
| 4,624,510 | 11/1986 | Jedziniak | 248/917 X |
| 5,062,609 | 11/1991 | Hames | 248/918 X |
| 5,383,643 | 1/1995 | Koch | 248/918 X |
| 5,443,237 | 8/1995 | Stadtmauer | 248/918 X |
| 5,509,628 | 4/1996 | Noble | 248/918 X |

*Primary Examiner*—Ramon O. Ramirez
*Assistant Examiner*—Sandra Snapp
*Attorney, Agent, or Firm*—Diller, Ramik & Wight, P.C.

[57] ABSTRACT

The invention is a keyboard tray which is formed from two relatively shallow molded bodies united along a periphery thereof to define an internal relatively flat chamber in which is slidable a mouse tray. The mouse tray can project outwardly of the chamber through either of opposite side edges of the keyboard tray. The mouse tray carries a projection which limits sliding movement of the mouse tray in its opposite directions. A rigid block of wood is secured in a recess portion of the keyboard tray to afford rigidity thereto and provide frictional purchase for screws which secure the keyboard to a keyboard tray mounting or support arm.

20 Claims, 2 Drawing Sheets

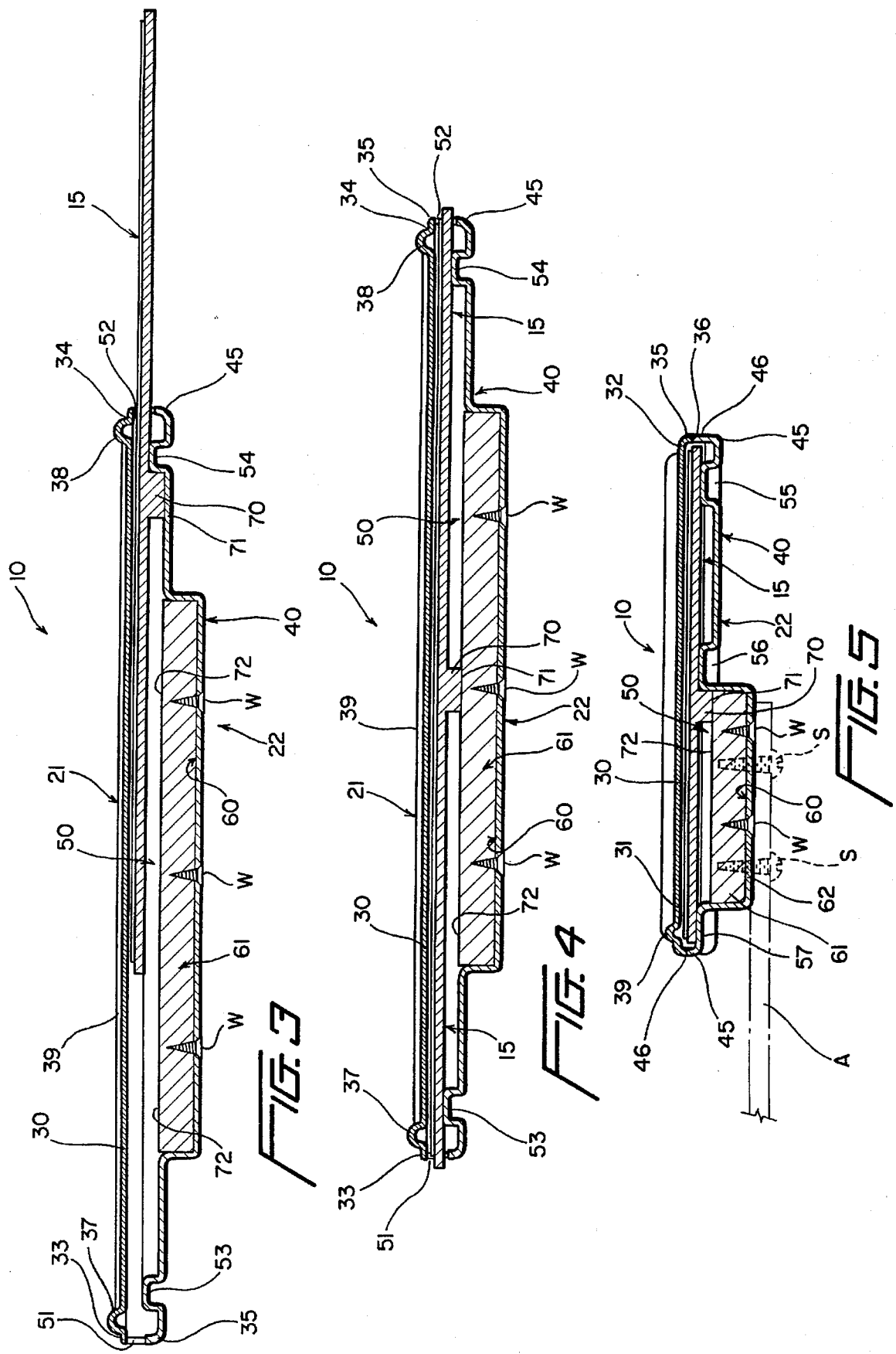

KEYBOARD TRAY

BACKGROUND OF THE INVENTION

This invention is directed to a keyboard tray particularly adapted for supporting any one of a variety of conventional keyboards and a mouse associated therewith.

The keyboard tray is preferably rigidly secured to a keyboard tray supporting arm which is articulately mounted relatively to a desk upon which is supported a conventional personal computer (PC). The keyboard tray houses a relatively flat mouse tray in slidable relationship thereto. The keyboard tray is preferably constructed from two pieces of compression molded, injection molded, vacuum molded or like formed polymeric/copolymeric synthetic plastic material which when united along a periphery thereof define upper and lower walls and a peripheral wall therebetween. The peripheral wall includes spaced opposite side wall portions each of which has a slot.

The peripheral wall maintains the upper and lower walls in generally spaced relationship and defines therebetween a relatively flat chamber. It is within the flat chamber that the relatively flat mouse tray is slidably housed with each of opposite side edges thereof being disposed generally adjacent the slots of the keyboard tray when the mouse tray is substantially housed within the flat chamber.

The mouse tray can be slid either to the left or to the right, as viewed from the perspective of the user thereof, such that opposite side edge portions and the upper surface thereof can alternately project beyond the slots and movably support thereupon a mouse while the associated keyboard is supported atop the upper wall of the keyboard tray. In this fashion a user can utilize an associated keyboard during the support thereof by the keyboard tray and can also manipulate a mouse associated with the personal computer upon either the left-hand or right-hand upper surface of the mouse tray.

Preferably, the mouse tray includes a projection for limiting the sliding movement thereof to the left and/or the right which assures that a limited predetermined area of the mouse tray can be slid either to the left or to the right which is sufficient to accommodate manipulation of the mouse, yet the exposure is not so large as to create an imbalance or undesired leverage should, for example, the user heavily rest his/her arm upon the exposed side edge portion of the tray which might tend to break the same or torque the keyboard tray sufficiently to break it away from the articulated mounting arm or at a minimum loosen the fastenings (generally screws) between the keyboard tray and the articulated mounting arm.

The upper surface of the mouse tray preferably has a relatively shallow recess in which is adhesively adhered a sheet of material having an upper surface of a high coefficient of friction which reduces mouse slippage and/or inadvertent mouse movement.

In further accordance with the present invention, the lower wall of the keyboard tray is preferably provided with a recess within which is secured a block of wood, composite board or a like piece of material for imparting reinforced rigidity to the overall keyboard tray. The block of wood is also relatively thick so that fasteners, such as screws, can be threaded therein to securely fasten an articulated or fixed keyboard tray support arm to the bottom of the keyboard tray.

In further accordance with the present invention, the upper wall of the keyboard tray is preferably reinforced at opposite side edges by upwardly projecting reinforcing ribs, whereas the lower wall is similarly reinforced by downwardly opening reinforcing channels.

Preferably, means are provided in the lower wall for providing universal mounting of the keyboard tray relative to a variety of a articulated and/or stationary keyboard tray mounting arms. These universal mounting means are a series of holes which selectively match holes a variety of conventional articulated and stationary keyboard tray mounting arms.

Prior art related to keyboards, keyboard trays, wrist rests and the like are reflected in the following United States patents:

| | | | | |
|---|---|---|---|---|
| Taslitz | U.S. Design Pat. No. | 347,422 | Issued: | 05/31/94 |
| Vaule | U.S. Design Pat. No. | 352,933 | Issued: | 11/20/94 |
| Juster | U.S. Design Pat. No. | 352,934 | Issued: | 11/29/94 |
| Dickerson | U.S. Design Pat. No. | 356,785 | Issued: | 03/28/95 |
| Gart | U.S. Pat. No. | 4,862,165 | Issued: | 08/29/89 |
| Connor | U.S. Pat. No. | 5,165,630 | Issued: | 11/24/92 |
| Nash | U.S. Pat. No. | 5,265,835 | Issued: | 11/30/93 |
| Thomsen | U.S. Pat. No. | 5,335,888 | Issued: | 08/09/94 |
| Martin | U.S. Pat. No. | 5,340,067 | Issued: | 08/23/94 |
| Kaneko | U.S. Pat. No. | 5,414,445 | Issued: | 05/09/95 |
| Rice | U.S. Pat. No. | 5,433,407 | Issued: | 07/18/95 |

SUMMARY OF THE INVENTION

This disclosure is directed to a keyboard tray particularly adapted for supporting any one of a variety of keyboards and an associated mouse. The keyboard tray is formed from two relatively shallow bodies of compression mold, injection mold or like molded polymeric/copolymeric material with the shallow bodies being united together by an adhesive along peripheral edges thereof to define a relatively flat keyboard tray having upper and lower walls and a peripheral wall therebetween with opposite side wall portions each having a slot. A mouse tray is housed generally within a chamber between the upper and lower walls of the keyboard tray, and the mouse tray can selectively slide through the slots to be exposed for right-hand or left-hand usage with an associated mouse. Preferably, a stop is carried by the mouse tray which limits outward sliding movement of the mouse tray relative to the keyboard tray. A wooden block is fixed within a chamber portion defined by the lower wall of the keyboard tray and functions to both rigidify the overall keyboard tray and provide sufficient material to achieve the efficient purchase or grip of screws which unite the keyboard tray to an associated articulated or fixed keyboard tray supporting arm.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 3 is an enlarged cross-sectional view taken generally along line 3—3 of FIG. 1, and illustrates details of the keyboard tray including a piece of wood for rigidifying the keyboard tray and a stop depending from a lower surface of the mouse tray for selectively contactingly abutting one of two internal ribs to limit the outward projection of the mouse tray from either side of the keyboard tray.

FIG. 4 is a cross-sectional view taken generally along line 4—4 of FIG. 2, and illustrates the mouse tray housed substantially within a chamber of the keyboard tray defined between upper and lower walls thereof with minor side edges of the mouse tray projecting slightly beyond side wall portions and associated slots of the keyboard tray.

FIG. 5 is a cross-sectional view taken generally along line 5—5 of FIG. 2, and illustrates a plurality of upstanding channels formed in the lower wall of the keyboard tray for guiding the sliding movement of the mouse tray and offering supporting rigidity thereto.

DESCRIPTION OF THE PREFERRED EMBODIMENT

Figure 1:
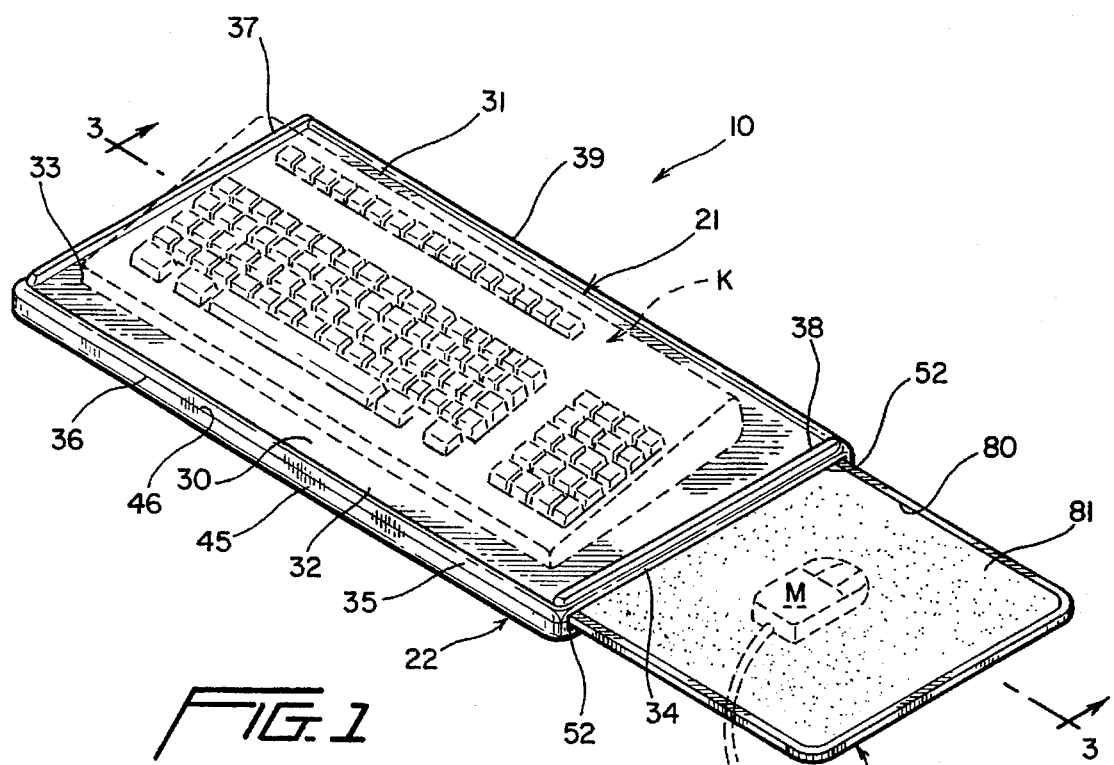
FIG. 1 is a top perspective view of a novel keyboard tray of the present invention, and illustrates in phantom outline a conventional keyboard associated therewith and a mouse associated with a mouse tray slid to its right-hand position of use.

A novel keyboard tray constructed in accordance with this invention is fully illustrated in the drawings and is generally designated by the reference numeral 10 which supports any one of a variety of conventional keyboards K (FIG. 1).

Figure 2:
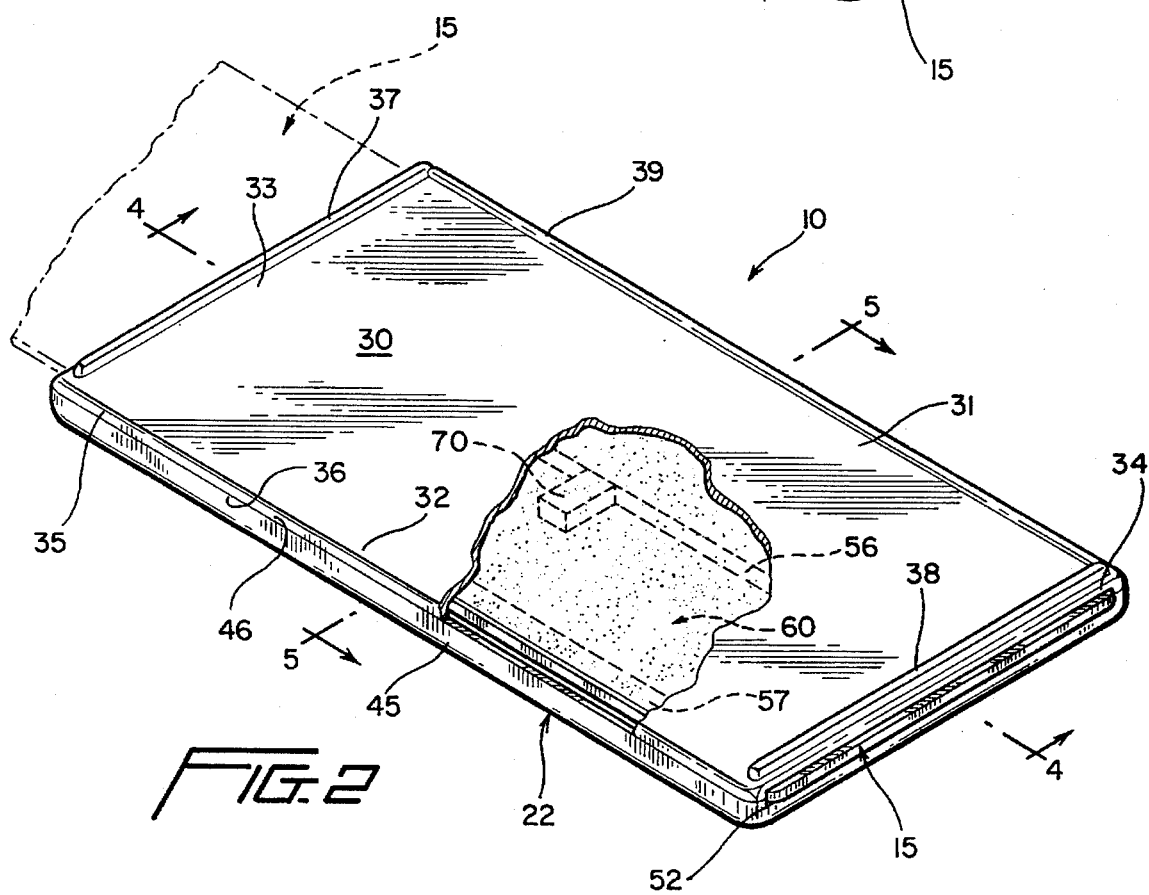
FIG. 2 is a perspective view of the keyboard tray of the invention with a portion of an upper wall broken away for clarity, and illustrates an interior chamber of the keyboard tray within which can be substantially housed the entirety of the mouse tray.

The keyboard tray 10 includes a slidable mouse tray 15 which can be housed substantially entirely with the keyboard tray 10, as shown in FIG. 2 in solid lines, or can be slid to the right, as shown in FIG. 1, and utilized thereat in conjunction with a conventional mouse M. The slide 15 can be slid to the left for left-hand use, as indicated in phantom outline in FIG. 2.

The keyboard tray 10 is preferably compression molded, injection molded or otherwise molded from polymeric/ copolymeric synthetic plastic material into two body portions, namely, an upper body portion 21 and a lower body portion 22.

The upper body portion 21 includes an upper relatively flat surface or wall 30 of a generally polygonal or rectangular configuration defined by a rear edge or rear edge portion 31, a front edge or front edge portion 32, a side edge or side edge portion 33 and another opposite side edge or side edge portion 34. Each of the edge portions 31-34 terminate in a downwardly depending peripheral edge portion or peripheral wall 35 terminating in a peripheral edge 36. Hollow upstanding ribs 37, 38 are located adjacent the respective side wall edges 33, 34 and a hollow upstanding rib 39 is located along the rear edge portion 31. The height of the hollow upstanding rib 39 is slightly less than the heights of the side ribs 37, 38. There is no upstanding rib along the front edge portion 32.

The lower body portion 22 includes a lower wall 40 which is generally of a stepped configuration, as is best illustrated in FIGS. 3 through 5 of the drawings. The lower wall 40 is of a polygonal or rectangular configuration corresponding in outline to that of the upper body portion 21. The lower body portion 22 likewise includes as part of the lower wall 40 an upwardly projecting polygonal peripheral edge or peripheral wall 45 terminating in a terminal peripheral edge 46. The peripheral wall 45 includes unnumbered front and rear walls and side walls whose peripheral edge 46 mates with and is bonded to the peripheral edge 36 of the peripheral wall 35 of the upper body portion 21. In this manner the upper body portion 21 and the lower body portion 22 define an interior chamber 50 of the keyboard tray 10 which is essentially closed except for opposite slots or slits 51, 52 formed in the side wall portions 33, 34 of the upper body portion 21 and the like side wall portions (unnumbered) of the lower body portion 22. The slots 51, 52 function to permit the mouse tray 15 to be housed generally entirely within the chamber 50 (FIG. 4) or slid to the right (FIGS. 1 and 3) or slid to the left (phantom outline in FIG. 2) depending upon conditions of use or nonuse and whether the mouse M is to be used right-handed (FIG. 1) or left-handed (phantom outline, FIG. 2).

The lower wall 40 includes a generally centrally located shallow upwardly opening rectangular recess portion 60 within which is seated a relatively thick piece of wood, composite or like material which is generally designated by the reference numeral 61. The piece of material 61 is adhesively adhered within the recess portion 60 and/or fastened therein by wood screws W. The function of the piece of material 61 is to reinforce and rigidify the overall keyboard tray 10 longitudinally or lengthwise, which, as viewed in FIG. 4, is left-to-right and vice versa. Thus, the piece of material 61 extends a substantial distance across the overall length of the keyboard tray 10 and thereby significantly effects the rigidity thereof.

Another function of the piece of material 61 is to permit the keyboard tray 10 to be fixed to a conventional stationary or articulated keyboard tray supporting arm A by one or more relatively large wood screws S or the equivalent thereof which pass through holes 62 in the recess portion 60 and are threaded into the piece of material 61. The latter affords a rigid connection between the keyboard tray 10 and the supporting arm A.

A final function of the piece of material 61 is that of offering central support to the mouse tray 15 by means of a lower projection or block 70 of the latter (FIGS. 4 and 5) projecting downwardly with a surface 71 thereof in sliding contact with an upper surface 72 of the piece of material 61. As is readily visualized in FIGS. 2, 4 and 5 of the drawings, whenever the projection 70 is atop the surface 72, it will be supported thereby, particularly when the mouse tray 15 is partially projected outwardly of either of the slots 51, 52, as opposed to the full outward projection shown in FIG. 3. Thus, the piece of material 61 affords the keyboard tray 10 the functions of rigidity/reinforcement, rigid securement to the keyboard tray supporting arm A, and support for the sliding mouse tray 15, The lower wall 40 also includes several upstanding ribs or downwardly opening channels which are identified by the reference numerals 53, 54 (FIG. 4) and 55, 56 (FIG. 5). The ribs or channels 53, 54 are located in generally parallel relationship to each other and each is adjacent its respective slot 51, 52. The upper walls (unnumbered) of the ribs 53, 54 underlyingly support the mouse tray 15 when projecting outwardly from the respective slots 51, 52, as is most evident from FIG. 3. Furthermore, the ribs 53, 54 function as abutments relative to the projection 70 depending from the mouse tray 15, as is best illustrated in FIG. 3. In this fashion, the projection 70 abuts the respective ribs 53, 54 to limit the outward projection of the mouse tray 15 from the respective slots 51, 52.

The ribs 55, 56 run longitudinally and generally normal to the ribs 53, 54, as is most apparent from FIG. 5. Upper walls (unnumbered) of the ribs 55, 56 support the underside of the mouse tray 15 respectively at the front edge 32 and centrally thereof. A ledge 57 (FIG. 5) lies in the horizontal plane of the upper wall portions (unnumbered) of the ribs or channels 55 or 56 and functions to support the rear edge (unnumbered) of the mouse tray 15. Thus, as is best illustrated in FIG. 5, the mouse tray 15 is supported longitudinally by the ribs or channels 55, 56 and the ledge 57 in any position of use (FIGS. 1 through 3) or storage (FIG. 4). The rib or channel 56 also functions as a longitudinal guide along which slides the projection 70, as is best illustrated in FIG. 5.

It is to be particularly noted that in the storage position of the mouse tray 15, the side edges (unnumbered) project slightly beyond the slots 51, 52. Therefore, the mouse tray 15 is never totally housed within the chamber 50 and a user need but push either edge to more fully expose the opposite edge so that the user can grasp the same and pull the mouse tray 15 to its desired position.

Preferably the upper surface (unnumbered) of the entirety of the mouse tray 15 is provided with a relatively shallow recess 80 (FIG. 1) of a generally rectangular or polygonal configuration. A piece of material having a high coefficient of friction, such as a piece of cloth 81 is seated within and is adhesively bonded within the recess 80. Since the mouse tray 15 is preferably constructed from molded polymeric/copolymeric plastic material and it's surface is thus relatively smooth or slick, the material 81 assures that the mouse M will essentially remain motionless when released by the user and will not, for example, inadvertently slide off the mouse tray 15 during the operation of the keyboard K.

Preferably, the openings 62 (FIG. 5) are so positioned and arranged that they will accommodate the fastener receiving holes in the numerous supporting arms A presently available in the market-place. For example, the holes 62 are so arranged that no matter the pattern of holes in the supporting arm A and no matter the make, model or manufacturer of the supporting arm A, the screws S will automatically fit the openings in the supporting arm A and those openings 62 in the recess portion 60 alignable therewith.

Although a preferred embodiment of the invention has been specifically illustrated and described herein, it is to be understood that minor variations may be made in the apparatus without departing from the spirit and scope of the invention, as defined the appended claims.

What is claimed is:

1. A keyboard tray particularly adapted for supporting any one of a variety of keyboards and an associated mouse comprising upper and lower walls and a peripheral wall therebetween, said peripheral wall including spaced opposite side wall portions, a slot in each side wall portion, said peripheral wall maintaining said upper and lower walls in generally spaced relationship and defining a relatively flat chamber therebetween, a single relatively flat slidable tray housed generally within said flat chamber, said flat slidable tray having opposite side edges each generally adjacent one of said side wall portions, and said single relatively flat slidable tray being slidable relative to said chamber such that opposite side edge portions of said single relatively flat slidable tray can alternatively project beyond an associate side wall portion to adapt the keyboard tray for selective right hand and left hand utilization of a mouse selectively upon either of said single relatively flat slidable tray side edge portions.

2. The keyboard tray as defined in claim 1 wherein said side edge portions each include an upper surface possessing a relatively high coefficient of friction to preclude inadvertent mouse movement/slippage thereon.

3. The keyboard tray as defined in claim 1 wherein said flat slidable tray includes an upper opening relatively shallow recess, and a piece of material having an upper surface possessing a relatively high coefficient of friction housed in said shallow recess to preclude inadvertent mouse movement/slippage thereon.

4. The keyboard tray as defined in claim 1 wherein said flat slidable tray includes an upper opening relatively shallow recess, and a piece of material having an upper surface possessing a relatively high coefficient of friction adhered in said shallow recess to preclude inadvertent mouse movement/slippage thereon.

5. The keyboard tray as defined in claim 1 including upstanding side reinforcing ribs projecting above said upper wall adjacent each side wall portion.

6. The keyboard tray as defined in claim 1 including upstanding side reinforcing ribs projecting above said upper wall adjacent each side wall portion, and an upstanding rear reinforcing rib projecting above said upper wall and generally spanning the distance between said side reinforcing ribs.

7. The keyboard tray as defined in claim 1 including means in said flat chamber secured to said lower wall for imparting reinforced rigidity thereto.

8. The keyboard tray as defined in claim 1 including means in said flat chamber secured to said lower wall for imparting reinforced rigidity thereto, and said reinforced rigidity imparting means is a block of wood.

9. The keyboard tray as defined in claim 1 including means in said flat chamber secured to said lower wall for imparting reinforced rigidity thereto, and said reinforced rigidity imparting means is a block of wood housed in an upwardly opening recess of said lower wall.

10. The keyboard tray as defined in claim 1 including a plurality of downwardly and outwardly opening channels in said lower wall for imparting rigidity thereto.

11. The keyboard tray as defined in claim 1 including a plurality of downwardly and outwardly opening channels in said lower wall for imparting rigidity thereto, and said channels include at least a pair of channel portions disposed in converging relationship relative to each other.

12. The keyboard tray as defined in claim 1 including a plurality of downwardly and outwardly opening channels in said lower wall for imparting rigidity thereto, and channels include at least a pair of laterally spaced side channel portions, one adjacent each side wall portion and a front channel portion extending between said side channel portions.

13. The keyboard tray as defined in claim 1 including a plurality of downwardly and outwardly opening channels in said lower wall for imparting rigidity thereto, channels include at least a pair of laterally spaced side channel portions, one adjacent each side wall portion and a front channel portion extending between said side channel portions, and said channels further include at least a pair of channel portions disposed in converging relationship relative to each other in a direction away from said front channel portion.

14. The keyboard tray as defined in claim 1 including means in said lower wall for providing universal mounting of said keyboard tray relative to a variety of articulated and/or stationary keyboard tray mounting arms.

15. The keyboard tray as defined in claim 1 including stop means carried by said flat slidable tray for limiting sliding movement of said flat slidable tray in each of opposite directions of sliding movement.

16. The keyboard tray as defined in claim 1 including stop means carried by a lower side of said flat slidable tray for limiting sliding movement of said flat slidable tray in each of opposite directions of sliding movement.

17. The keyboard tray as defined in claim 2 including stop means carried by said flat slidable tray for limiting sliding movement of said flat slidable tray in each of opposite directions of sliding movement.

18. The keyboard tray as defined in claim 17 including means in said flat chamber secured to said lower wall for imparting reinforced rigidity thereto.

19. The keyboard tray as defined in claim 17 wherein said flat slidable tray includes an upper opening relatively shallow recess, and a piece of material having an upper surface possessing a relatively high coefficient of friction housed in said shallow recess to preclude inadvertent mouse movement/slippage thereon.

20. The keyboard tray as defined in claim 19 wherein the distance between terminal side edges of said flat slidable tray is less than the distance between said slots whereby at least one of said flat slidable tray terminal side edges is at all times accessible at one of said slots.

* * * * *